US009891878B2

(12) United States Patent
Minegishi

(10) Patent No.: US 9,891,878 B2
(45) Date of Patent: Feb. 13, 2018

(54) INFORMATION PROCESSING SYSTEM, INFORMATION PROCESSING APPARATUS, AND COMPUTER-READABLE RECORDING MEDIUM

(71) Applicant: Youichi Minegishi, Kanagawa (JP)

(72) Inventor: Youichi Minegishi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 27 days.

(21) Appl. No.: 15/067,862

(22) Filed: Mar. 11, 2016

(65) Prior Publication Data

US 2016/0274846 A1    Sep. 22, 2016

(30) Foreign Application Priority Data

Mar. 20, 2015 (JP) ................................. 2015-058501
Jan. 28, 2016 (JP) ................................. 2016-014780

(51) Int. Cl.
*G06F 3/12* (2006.01)

(52) U.S. Cl.
CPC .......... *G06F 3/1292* (2013.01); *G06F 3/1205* (2013.01); *G06F 3/1232* (2013.01); *G06F 3/1253* (2013.01); *G06F 3/1288* (2013.01); *G06F 3/1226* (2013.01); *G06F 3/1247* (2013.01)

(58) Field of Classification Search
USPC ....................................................... 358/1.15
See application file for complete search history.

(56) References Cited

U.S. PATENT DOCUMENTS

| | | | |
|---|---|---|---|
| 8,537,438 B2 * | 9/2013 | Kurihara | G06F 3/1206 358/1.13 |
| 8,726,370 B2 | 5/2014 | Minegishi | |
| 2002/0126197 A1 * | 9/2002 | Minowa | B41J 2/355 347/193 |
| 2003/0071823 A1 * | 4/2003 | Fukasawa | H04N 1/60 345/589 |
| 2007/0223024 A1 * | 9/2007 | Takesada | G06F 3/1204 358/1.13 |
| 2009/0217161 A1 | 8/2009 | Minegishi | |
| 2009/0225349 A1 * | 9/2009 | Hirai | H04N 1/00204 358/1.15 |
| 2010/0290066 A1 * | 11/2010 | Son | H04N 1/6011 358/1.9 |
| 2013/0194595 A1 * | 8/2013 | Murata | G06K 15/4065 358/1.9 |
| 2015/0138589 A1 * | 5/2015 | Minagawa | G06F 3/1205 358/1.14 |
| 2015/0378649 A1 * | 12/2015 | Akiyama | G06F 3/1285 358/1.15 |

(Continued)

FOREIGN PATENT DOCUMENTS

JP    2014-021822    2/2014

*Primary Examiner* — Jerome Grant, II
(74) *Attorney, Agent, or Firm* — Harness, Dickey & Pierce, P.L.C.

(57) ABSTRACT

An information processing system includes an acquirer configured to acquire, from a printer driver, at least one setting option settable in the printer driver; a generator configured to generate first display information for displaying, on a terminal device, a setting screen that allows setting of the acquired setting option; and a transmitter configured to transmit the first display information to the terminal device.

10 Claims, 14 Drawing Sheets

(56) References Cited

U.S. PATENT DOCUMENTS

2016/0077777 A1\* 3/2016 Kobayashi ............ G06F 3/1205
                                                    358/1.15
2016/0253132 A1\* 9/2016 Nishida .............. H04N 1/00973
2017/0171426 A1\* 6/2017 Park ................... H04N 1/32776

\* cited by examiner

FIG.3

```
HTTP/1.1 200 OK
Date:Mon, 06 Feb 2012 00:00:00 GMT
Vary:Accept-Encoding
Content-Type:text/xml;charset="UTF-8"
Cache-Control:private
Connection:close
<?xml version="1.0"encoding="UTF-8"?><psf:PrintCapabilities
xmlns:psf="http://schemas.AAA.com/···/printing/printsche
maframework" xmlns:xsd="http://www.w3.org/2001/XMLSchema"
xmlns:xsi="http://www.w3.org/2001/XMLSchema-instance"
xmlns:psk="http://schemas.AAA.com/···/printing/printsche
makeywords"
xmlns:ns0000="http://schemas.BBB.com/···/printing/keywords"
version="1">
······
<psf:Feature name="psk:PageOutputColor">
<psf:Property name="psf:SelectionType">
<psf:Value xsi:type="xsd:QName">psk:PickOne</psf:Value>
</psf:Property>
<psf:Option name="psk:Color"/>
<psf:Option name="psk:Monochrome"/>
</psf:Feature>
...
<psf:ParameterDef name="psk:JobCopiesAllDocuments">
<psf:Property name="psf:DataType">
<psf:Value xsi:type="xsd:QName">xsd:integer</psf:Value>
</psf:Property>
<psf:Property name="psf:UnitType">
<psf:Value xsi:type="xsd:string">copies</psf:Value>
</psf:Property>
<psf:Property name="psf:Multiple">
<psf:Value xsi:type="xsd:integer">1</psf:Value>
</psf:Property>
<psf:Property name="psf:MaxValue">
<psf:Value xsi:type="xsd:integer">999</psf:Value>
</psf:Property>
<psf:Property name="psf:MinValue">
<psf:Value xsi:type="xsd:integer">1</psf:Value>
</psf:Property>
<psf:Property name="psf:DefaultValue">
<psf:Value xsi:type="xsd:integer">1</psf:Value>
</psf:Property>
<psf:Property name="psf:Mandatory">
<psf:Value xsi:type="xsd:QName">psk:Unconditional</psf:Value>
</psf:Property>
</psf:ParameterDef>
...
</psf:PrintCapabilities>
```

| FILE NAME | FULL PATH |
|---|---|
| Aaa.docx | C:\Users\hogehoge\Documents\Aaa.docx |
| Bbb.pptx | C:\Users\hogehoge\Documents\Bbb.pptx |
| ccc.jpg | C:\Users\hogehoge\Documents\ccc.jpg |

FIG.13

```
HTTP/1.1 200 OK
Date:Mon, 06 Feb 2012 00:00:00 GMT
Vary:Accept-Encoding
Content-Type:text/xml;charset="UTF-8"
Cache-Control:private
Connection:close
<?xml version="1.0"encoding="UTF-8"?>
<DocumentList>
<FileList>
<file name="Aaa.docx"path="C:\Users\hogehoge\Documents\Aaa.docx"/>
<file name="Bbb.pptx"path="C:\Users\hogehoge\Documents\Bbb.pptx"/>
<file name="ccc.jpg"path="C:\Users\hogehoge\Documents\ccc.jpg"/>
</FileList>
```

FIG.14

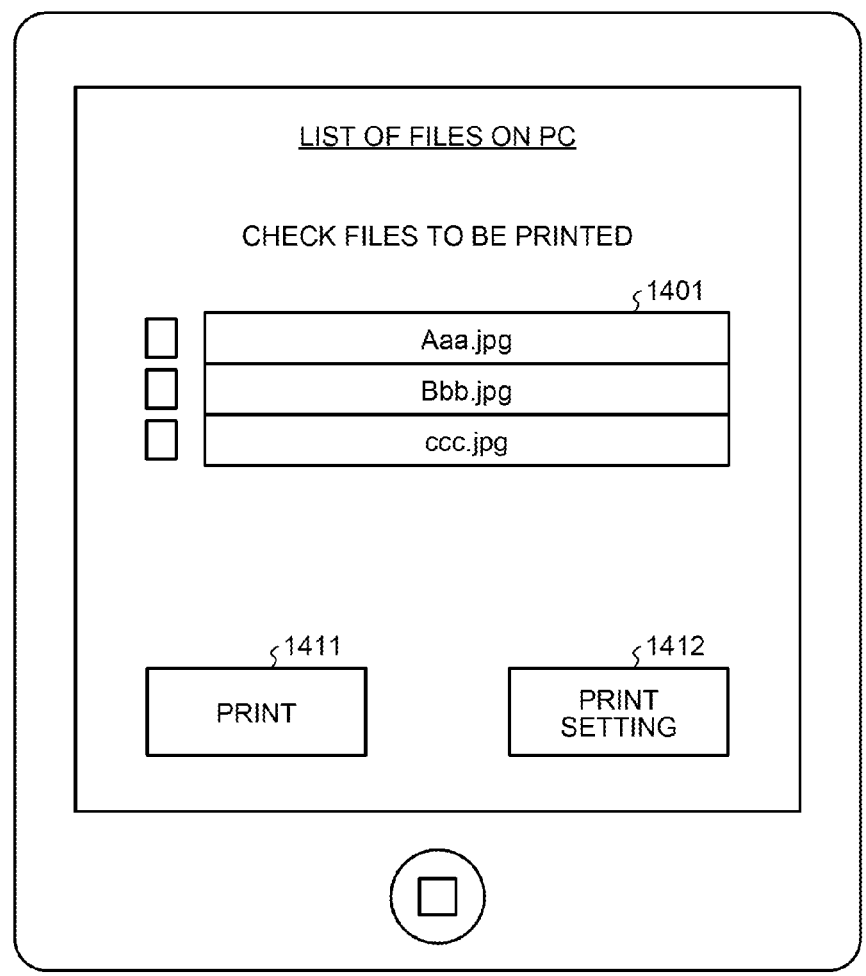

INFORMATION PROCESSING SYSTEM, INFORMATION PROCESSING APPARATUS, AND COMPUTER-READABLE RECORDING MEDIUM

CROSS-REFERENCE TO RELATED APPLICATIONS

The present application claims priority to and incorporates by reference the entire contents of Japanese Patent Application No. 2015-058501 filed in Japan on Mar. 20, 2015 and Japanese Patent Application No. 2016-014780 filed in Japan on Jan. 28, 2016.

BACKGROUND OF THE INVENTION

1. Field of the Invention

The present invention relates to an information processing system, an information processing apparatus, and a computer-readable recording medium.

2. Description of the Related Art

Known printing techniques include: the technique of converting a document to be printed into a printer-readable data format by a terminal device such as a mobile device and transmitting this document to a printer; the technique of transmitting a document to be printed to a network service provided by a cloud printer server, converting this document into a printer-readable data format by the service, and transmitting the document to a printer; and the technique of printing from the mobile device using a printer driver installed in an information processing apparatus such as a personal computer (PC).

Japanese Patent Application Laid-open No. 2014-021822 discloses the technique of performing printing from the mobile device using the printer driver through an agent of the PC so as to prevent corruption of a display layout due to different fonts provided by different operating systems (OSs).

However, the conventional technology fails to specify functions of the printer driver installed in the PC used by the user of the mobile device, and thus the function provided by the printer driver may not be used from the mobile device in some cases. In addition, print settings used by the user on the PC may not be used from the mobile device.

Therefore, there is a need to achieve more effective use of functions of the printer driver in printing from a terminal device such as the mobile device.

SUMMARY OF THE INVENTION

It is an object of the present invention to at least partially solve the problems in the conventional technology.

According to an embodiment, there is provided an information processing system that includes an acquirer configured to acquire, from a printer driver, at least one setting option settable in the printer driver; a generator configured to generate first display information for displaying, on a terminal device, a setting screen that allows setting of the acquired setting option; and a transmitter configured to transmit the first display information to the terminal device.

According to another embodiment, there is provided an information processing apparatus that includes an acquirer configured to acquire, from a printer driver, at least one setting option settable in the printer driver; a generator configured to generate first display information for displaying, on a terminal device, a setting screen that allows setting of the acquired setting option; and a transmitter configured to transmit the first display information to the terminal device.

According to still another embodiment, there is provided a non-transitory computer-readable storage medium with an executable program stored thereon and executed by a computer. The program instructs the computer to perform acquiring, from a printer driver, at least one setting option settable in the printer driver; generating first display information for displaying, on a terminal device, a setting screen that allows setting of the acquired setting option; and transmitting the first display information to the terminal device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 illustrates exemplary setting options and setting values;

FIG. 13 illustrates an exemplary file list converted into a format for transmission to a mobile device;

FIG. 14 illustrates an exemplary selection screen that displays acquired file information and allows selection of a file to be printed;

DETAILED DESCRIPTION OF THE PREFERRED EMBODIMENTS

An information processing system, an information processing apparatus, and a computer program according to exemplary embodiments the present invention are described below in detail with reference to the accompanying drawings.

First Embodiment

In a first embodiment of the present invention, a mobile device (exemplary terminal device) inquires of a printer driver through a printing service executed by a PC (exemplary information processing apparatus) about setting options (abilities) and setting values. Then, this printing service or mobile device constructs, with reference to this acquired information, a setting screen that allows the mobile device to configure a print setting. The mobile device instructs, to the printer driver through the printing service, printing in accordance with the print setting set on the setting screen. Thus, the mobile device can perform printing using print settings and functions of the printer driver that are used on the PC. Accordingly, the functions of the printer driver can be further effectively used in printing from the mobile device.

Figure 1:
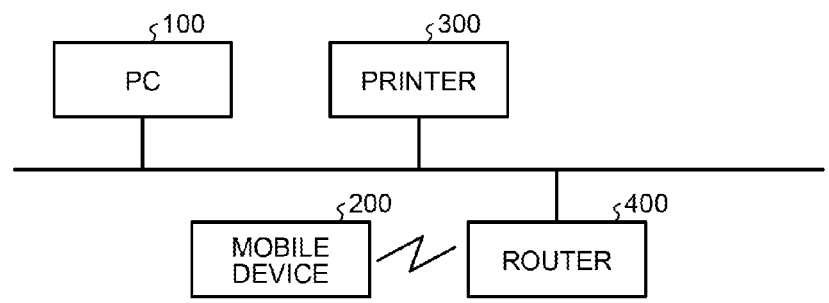
FIG. 1 is a block diagram of an exemplary configuration of an information processing system according to a first embodiment of the present invention.

FIG. 1 is a block diagram of an exemplary configuration of an information processing system according to the first embodiment. The information processing system includes a PC 100, a mobile device 200, a printer 300, and a router 400. Although FIG. 1 illustrates a single unit for each device, each of the devices may include two or more units.

The PC 100, the printer 300, and the router 400 are connected through an optional network such as a local area network (LAN). The router 400 is a device that relays connection of the mobile device 200 to this network. The mobile device 200 communicates with other devices through the router 400 by, for example, a wireless LAN. In this case, the router 400 needs to have a function as a wireless LAN router. A communication method of the mobile device 200 is not limited to wireless communication, but may be wired communication.

Figure 2:
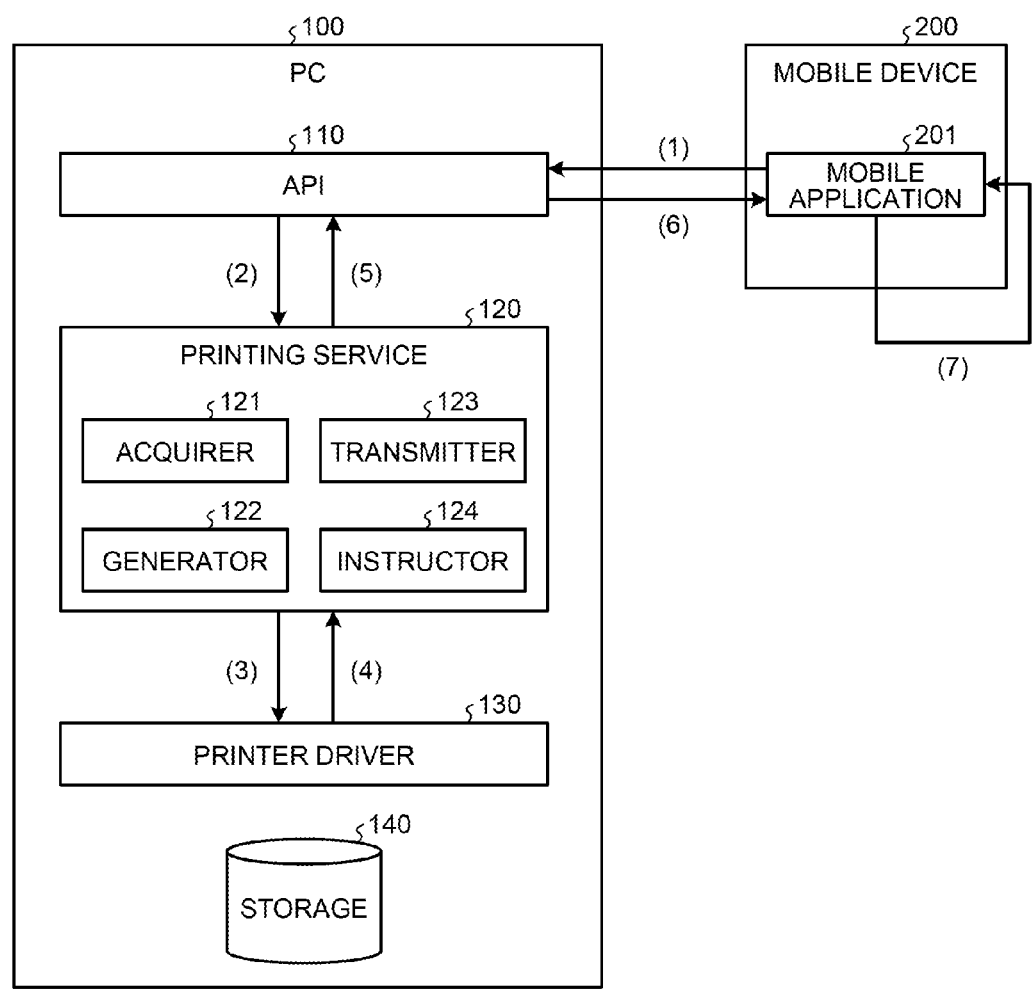
FIG. 2 is a block diagram of exemplary functional configurations of a PC and a mobile device according to the first embodiment.

FIG. 2 is a block diagram of exemplary functional configurations of the PC 100 and the mobile device 200. As illustrated in FIG. 2, the PC 100 includes an application programming interface (API) 110, a printing service 120, a printer driver 130, and a storage 140.

The API 110 is an interface that allows a function of the printing service 120 to be used from an external device such as the mobile device 200. The API 110 may be, for example, a Web API using the POST method (or the GET method) of the hypertext transfer protocol (HTTP).

The printing service 120 provides various functions that allow the mobile device 200 to perform printing via the printer driver installed in the PC. The printing service 120 includes an acquirer 121, a generator 122, a transmitter 123, and an instructor 124.

The acquirer 121 performs processing of acquiring information from, for example, the printer driver 130. The acquirer 121 acquires, from the printer driver 130, for example, at least one setting option settable in the printer driver 130, and a setting value settable in this setting option. The acquirer 121 may acquire a current setting value of each setting option. In a case in which a plurality of printer drivers 130 have been installed, the acquirer 121 may acquire setting options and setting values from a specified printer driver 130.

The generator 122 generates display information (first display information) for displaying, on the terminal device, a setting screen that allows setting of the acquired setting option. This display information may be information necessary for the mobile device 200 to generate and display the setting screen, or may be the setting screen itself. In other words, the setting screen may be generated by either of the PC 100 and the mobile device 200.

The transmitter 123 transmits various kinds of information to an external device such as the mobile device 200. For example, the transmitter 123 transmits the generated display information to the mobile device 200.

The instructor 124 instructs the printer driver 130 to perform printing. For example, having received a printing request in accordance with the setting option set on the setting screen from the mobile device 200, the instructor 124 instructs the printer driver 130 to perform printing in accordance with this printing request.

Each component (the acquirer 121, the generator 122, the transmitter 123, and the instructor 124) included in the printing service 120 may be achieved, for example, through execution of a computer program by a processing apparatus such as a central processing unit (CPU), in other words, by software, or may be achieved by hardware such as an integrated circuit (IC). Alternatively, the component may be achieved using both software and hardware.

The printer driver 130 receives print settings for various setting options such as a staple function and a punch function, and causes the printer 300 to execute printing in accordance with the received print settings.

The storage 140 stores therein various kinds of information. The storage 140 may include a generally available recording medium, such as a hard disk drive (HDD), an optical disk, a memory card, and a random access memory (RAM).

The mobile device 200 includes a mobile application 201. The mobile application 201 is an application to execute printing through the printer driver 130 in cooperation with the printing service 120.

The following describes, with reference to FIG. 2, exemplary acquisition processing ((1) to (7) in FIG. 2) in which the mobile device 200 acquires print settings by using the printing service 120 installed in the PC 100. This processing may be started by the mobile application 201, for example, when printing of document data is specified by a user.

(1) In order to acquire a setting option (ability) settable in the printer driver 130, the mobile application 201 transmits a request to acquire the setting option (and its setting value) to the PC 100 (the API 110).

(2) The API 110 transmits the request to acquire the setting option to the printing service 120.

(3) The printing service 120 (the acquirer 121) requests the printer driver 130 to acquire the setting option and the setting value.

For example, when the PC 100 operates on Windows (registered trademark) that is an OS, the printing service 120 may acquire PrintTicket and PrintCapability as the setting option and the setting value. PrintCapability is information including a setting option settable in the printer driver 130 and a setting value settable in this setting option. PrintTicket is information including a current setting value. PrintTicket and PrintCapability (PT/PC) can be called through an API in ".Net Framework" for Windows. The current setting value is a default setting value to be displayed first, for example, when the PC 100 requests the printer driver 130 to display a setting value.

The acquirer 121 acquires at least PrintCapability from the printer driver 130. Accordingly, the generator 122 can generate display information for displaying, on the terminal device, a setting screen that allows setting of a setting option included in PrintCapability and a setting value settable in this setting option. Acquisition of PrintTicket by the acquirer 121 allows the generator 122 to generate display information on a setting screen on which the current setting value is set as, for example, a default value.

(4) The printer driver 130 transmits the setting option and the setting value to the printing service 120 in response to the request.

(5) The printing service 120 attaches an HTTP response header to the acquired setting option and setting value, and passes them to the API 110. In this example, the setting option and the setting value to which the HTTP header is attached correspond to display information (first display information) for displaying a setting screen. The HTTP is not a limiting example of an applicable communication protocol. When a protocol other than the HTTP is used, the printing service 120 attaches information including a header to the setting option and the setting value in accordance with this protocol as necessary.

(6) The API 110 transmits the received setting option and setting value to the mobile application 201.

FIG. 3 illustrates exemplary setting options and setting values. FIG. 3 illustrates exemplary data of PrintCapability acquired from the printer driver 130, to which the HTTP header is attached. Lines 1 to 6 correspond to this HTTP header. Although not illustrated in FIG. 3, PrintTicket may be included.

PrintCapability in an XML format as illustrated in FIG. 3 can be acquired through an API in ".Net Framework" for Windows. In FIG. 3, color (PageOutputColor) and the number of copies (JobCopiesAllDocuments) are listed as exemplary setting options. Color and Monochrome are listed as setting values settable in setting options of the color. Listed setting values settable in setting options of the number of copies include, for example, a minimum value (MinValue) of 1, a maximum value (MaxValue) of 999, and data type (DataType) of integer.

The printing service 120 may transmit the setting option and the setting value to the mobile application 201 without converting the format of them, or may convert the format into another format before transmission to the mobile application 201. For example, when the mobile application 201 supports the data format of JavaScript (registered trademark) Object Notation (JSON), the printing service 120 may convert the format of the setting option and the setting value into JSON before transmitting them.

The following description is made with reference to FIG. 2.

(7) The mobile application 201 produces a setting screen for the printer driver 130 in accordance with the received setting option and the setting value.

Figure 4:
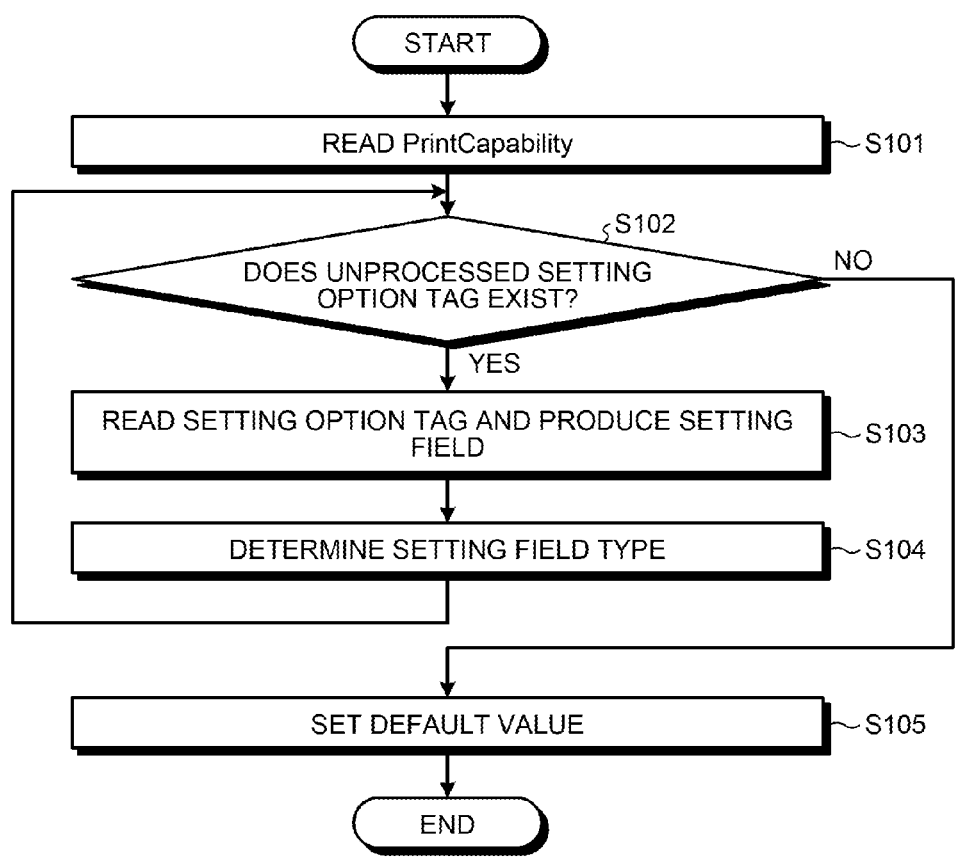
FIG. 4 is a flowchart of exemplary processing of producing a setting screen.

FIG. 4 is a flowchart of exemplary processing of producing a setting screen. This production processing is executed by, for example, the mobile application 201 that has received display information from the PC 100. The following describes an example in which the mobile application 201 has received, as the display information, PrintCapability and PrintTicket written in the XML format. When an OS other than Windows is used, display information corresponding to PrintCapability and PrintTicket may be used to execute the same processing.

The mobile application 201 reads PrintCapability from the received display information (step S101). In the example of FIG. 3, the mobile application 201 reads the section enclosed in the "psf:PrintCapabilities" tag.

The mobile application 201 determines whether an unprocessed setting option tag exists in read PrintCapability (step S102). The mobile application 201 determines whether, for example, a setting option tag that matches a predetermined tag name ("Feature name", "ParameterDef name", or the like in the example of FIG. 3) is included.

If an unprocessed setting option tag exists (Yes at step S102), the mobile application 201 reads information defined in this setting option tag and produces a setting field corresponding to the read setting option tag (step S103). For example, the mobile application 201 reads, from a setting option tag of which "Feature name" is "PageOutputColor", information indicating that "Color" and "Monochrome" can be selected as setting values. Then, the mobile application 201 produces, in accordance with this information, a setting field in which "Color" and "Monochrome" can be selected. The mobile application 201 produces the setting field on, for example, a setting screen produced in advance.

The mobile application 201 may determine the type of a setting field with reference to, for example, information and a settable setting value specified in PrintCapability (step S104). In the example of FIG. 3, the type of "ParameterDef name" is specified as options (SelectionType, PickOne) any one of which is to be selected. The mobile application 201 may produce a setting field that allows selection of any one of "Color" and "Monochrome" in accordance with such information. When the data type (for example, integer (Integer) or text) of a setting value is specified, the mobile application 201 may produce a setting field that allows input of information of the specified data type. This can avoid a setting option or a setting value not to be specified from being specified.

Thereafter, the process returns to step S102 and repeats the processing. If it has been determined at step S102 that no unprocessed setting option tag exists (No at step S102), the mobile application 102 sets a default value for a produced setting field (step S105) and ends the production processing. For example, the mobile application 201 sets a current setting value in PrintTicket as a default value for the setting screen. This makes the same setting value as a setting value used by the user on the PC 100 easily available.

Figure 5:
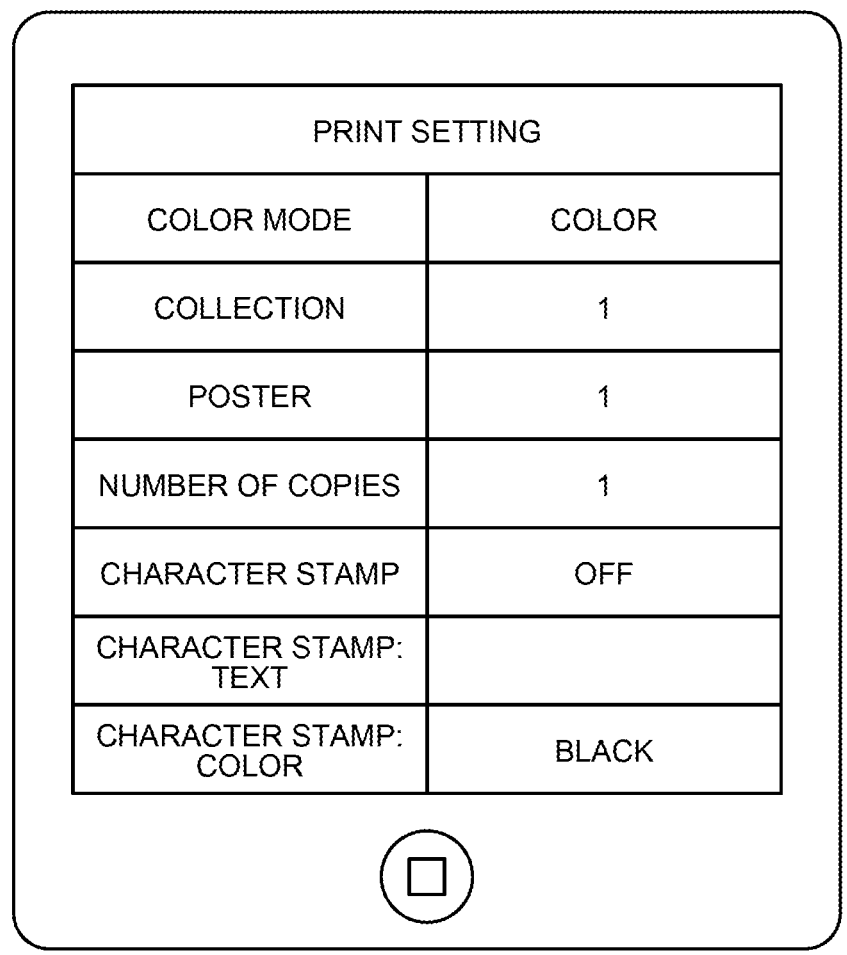
FIG. 5 illustrates an example of a produced setting screen.

FIG. 5 illustrates an exemplary produced setting screen. FIG. 5 illustrates an exemplary setting screen on which a color mode, a collection, a poster, the number of copies, and a character stamp are settable as setting options. For example, a function such as character stamp is provided to the printer driver 130 and becomes available when a setting value is set in the printer driver 130. The present embodiment can produce a setting screen using a setting option and a setting value acquired from the printer driver 130, thereby making such a function available from the mobile device 200.

Figure 6:
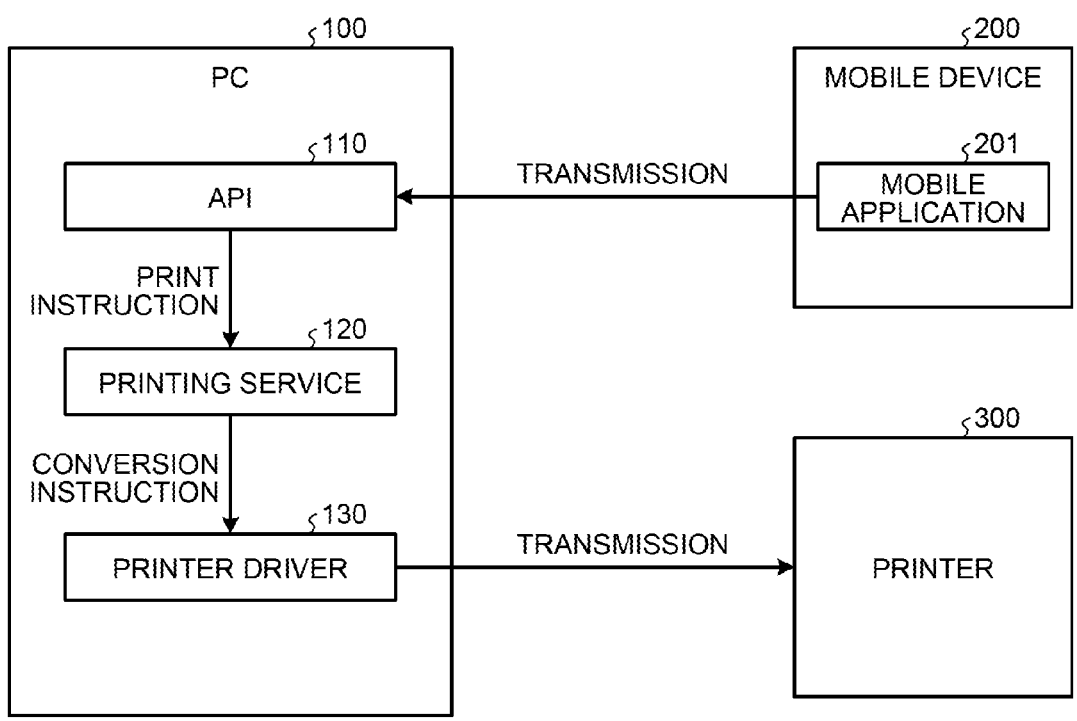
FIG. 6 is a diagram for describing a process of printing processing.

When a setting screen is generated and displayed on, for example, a display unit of the mobile device 200, the user sets a setting option on this setting screen. Thereafter, the user instructs printing with this setting option thus set on, for example, a screen displayed by the mobile application 201. FIG. 6 is a diagram for describing a process of the printing processing instructed as described above.

The mobile application 201 converts the format of the setting option thus set on the setting screen into, for example, PrintTicket. The mobile application 201 transmits PrintTicket and document data to be printed to the printing service 120 through the API 110. This document data may be in any optional format that can be processed by the PC 100, and may be, for example, image data such as Joint Photographic Experts Group (JPEG) data and Portable Network Graphics (PNG) data, and text data produced by a word processor or the like.

The printing service 120 passes the document data received through the API 110 and print settings (PrintTicket)

to the printer driver 130. When the print setting is received in the format of PrintTicket, the printing service 120 passes the print settings to the printer driver 130 by using, for example, a Windows API that can specify PrintTicket. When an invalid setting value is included, the printer driver 130 may set the corresponding setting option to a default value. The document data can be printed by using, for example, the function of Object Linking and Embedding (OLE) provided by Windows.

Figure 7:
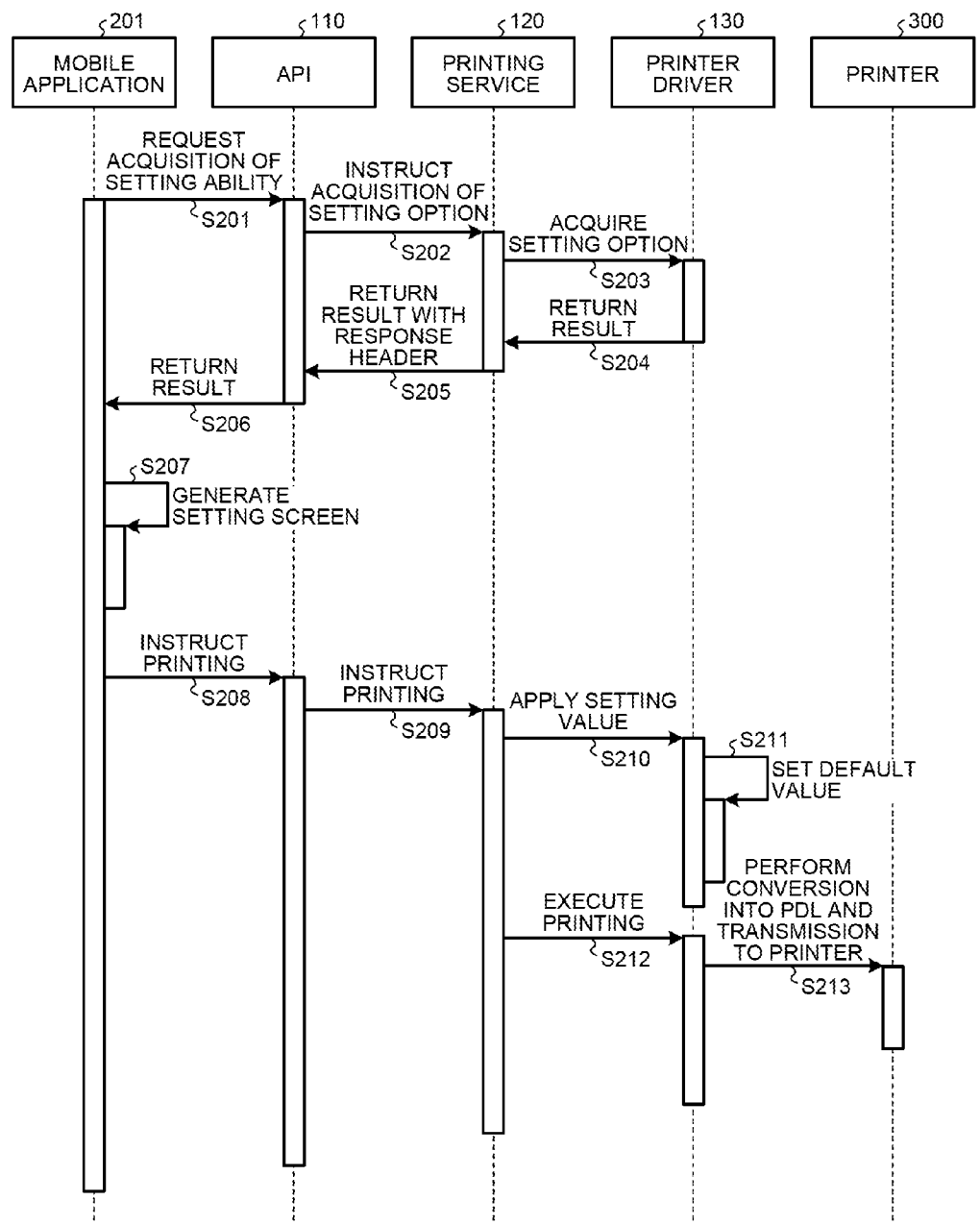
FIG. 7 is a sequence diagram of an exemplary process from processing of producing the setting screen to printing processing.

FIG. 7 is a sequence diagram of an exemplary process from the processing of producing a setting screen to the printing processing. First, the mobile application 201 transmits the request to acquire a setting option to the API 110 of the PC 100 (step S201). This acquisition request may include information for specifying the printer driver 130 of which setting option is to be acquired.

The API 110 transmits the request to acquire the setting option to the printing service 120 (step S202). The printing service 120 acquires the setting option from the printer driver 130 by using, for example, a Windows API (step S203). The printer driver 130 returns the setting option to the printing service 120 (step S204).

The printing service 120 attaches a response header to the setting option returned from the printer driver 130, and returns it to the API 110 (step S205). The API 110 returns the setting option received from the printing service 120 to the mobile application 201 (step S206).

The mobile application 201 generates and displays a setting screen that allows setting of the received setting option in accordance with, for example, the flowchart illustrated in FIG. 4 (step S207). When execution of printing is specified by, for example, the user, the mobile application 201 instructs the printing service 120 through the API 110 to perform printing (steps S208 and S209).

The printing service 120 sets a setting value specified by, for example, PrintTicket in the printer driver 130 (step S210). The printer driver 130 may set a setting option to which no setting value is specified and a setting option to which an invalid setting value is set to a default value (step S211).

The printing service 120 instructs the printer driver 130 to execute printing (step S212). The printer driver 130 generates a page description language (PDL) in accordance with the set setting value and transmits it to the printer 300 (step S213).

As described above, the present embodiment can produce a setting screen based on a setting option and a setting value acquired from a printer driver, and execute printing in accordance with a setting value thus set on this setting screen. This allows a mobile device to perform printing using a print setting used on a PC and a function of the printer driver.

Second Embodiment

A second embodiment of the present invention describes an example in which a plurality of printer drivers are installed in a PC. The printer drivers may have different setting options and setting values from each other, and thus a setting option and a setting value can be set incorrectly unless which printer driver is to be used is specified. In the present embodiment, a printer driver to be used is specified based on information on the printer 300 to be used.

Figure 8:
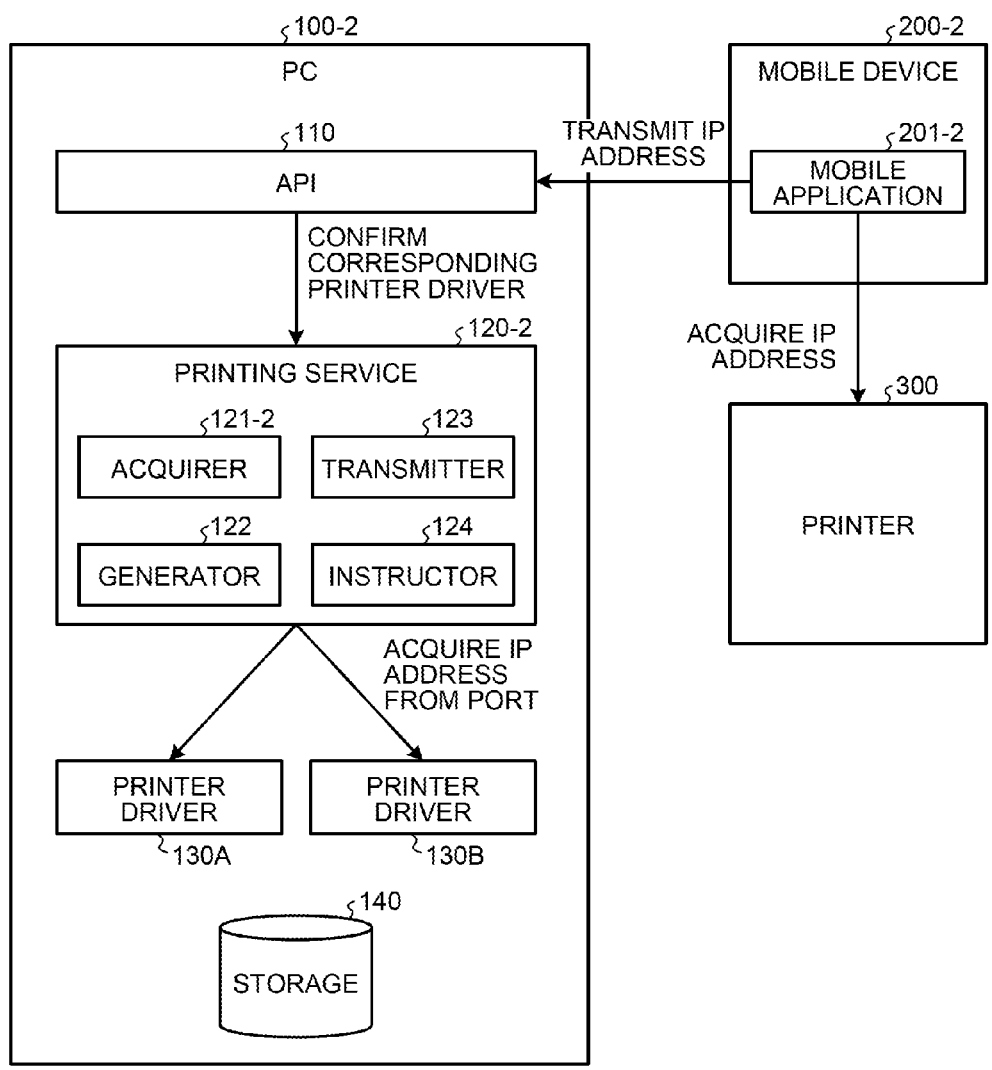
FIG. 8 is a block diagram of exemplary functional configurations of a PC and a mobile device according to a second embodiment of the present invention.

FIG. 8 is a block diagram of exemplary functional configurations of a PC 100-2 and a mobile device 200-2 according to the present embodiment. Other devices (the printer 300 and the router 400) have the same configurations as those of the first embodiment and thus are denoted by the same reference signs, and descriptions thereof will be omitted.

As illustrated in FIG. 8, the PC 100-2 includes the API 110, a printing service 120-2, printer drivers 130A and 130B, and the storage 140. The mobile device 200-2 includes a mobile application 201-2. When not needed to be distinguished, the printer drivers 130A and 130B are simply referred to as the printer driver 130. The number of the printer drivers 130 is not limited to two but may be three or more.

In the second embodiment, the printing service 120-2 and the mobile application 201-2 have functions different from those in the first embodiment. Other configurations and functions are the same as those illustrated in FIG. 2, which is a block diagram according to the first embodiment, and thus denoted by the same reference signs, and descriptions thereof will be omitted.

The mobile application 201-2 differs from the mobile application 201 according to the first embodiment in that the mobile application 201-2 has an additional function of acquiring, from the printer 300 to be used, identification information that identifies this printer 300, and transmitting it to the PC 100-2.

The printing service 120-2 differs from the printing service 120 according to the first embodiment in that the printing service 120-2 has an additional function of specifying the printer driver 130 corresponding to an IP address transmitted from the mobile application 201-2. The printing service 120-2 includes an acquirer 121-2, the generator 122, the transmitter 123, and the instructor 124.

The acquirer 121-2 includes, in addition to the function of the acquirer 121 according to the first embodiment, a function of acquiring information necessary to specify the printer driver 130 corresponding to the IP address transmitted from the mobile application 201-2.

The following describes, with reference to FIG. 2, a specific example of processing of specifying the printer driver 130. The mobile application 201-2 acquires from the printer 300 to be used, for example, an Internet Protocol (IP) address as identification information of this printer 300. The identification information of the printer 300 is not limited to the IP address. The mobile application 201-2 acquires the IP address of the printer 300 by an optional method such as near field communication (NFC), two-dimensional barcode recognition, or manual inputting. When the IP address of the printer 300 to be used is set in the mobile device 200 in advance, the mobile application 201-2 does not need to have the function of acquiring an IP address.

The mobile application 201-2 transmits the acquired IP address to the printing service 120-2 through the API 110. Having received the IP address, the printing service 120-2 detects the printer driver 130 installed in the PC 100-2. For example, the acquirer 121-2 of the printing service 120-2 can enumerate (detect) installed printer drivers 130 by using the EnumPrinters( ) function defined in Windows. This function can also acquire the port of the printer 300 connected with each printer driver 130.

The acquirer 121-2 can acquire the IP address associated with the port by using, for example, the xcvData function defined in Windows. The acquirer 121-2 specifies a printer driver 130 to be used by comparing IP addresses acquired in this manner.

Figure 9:
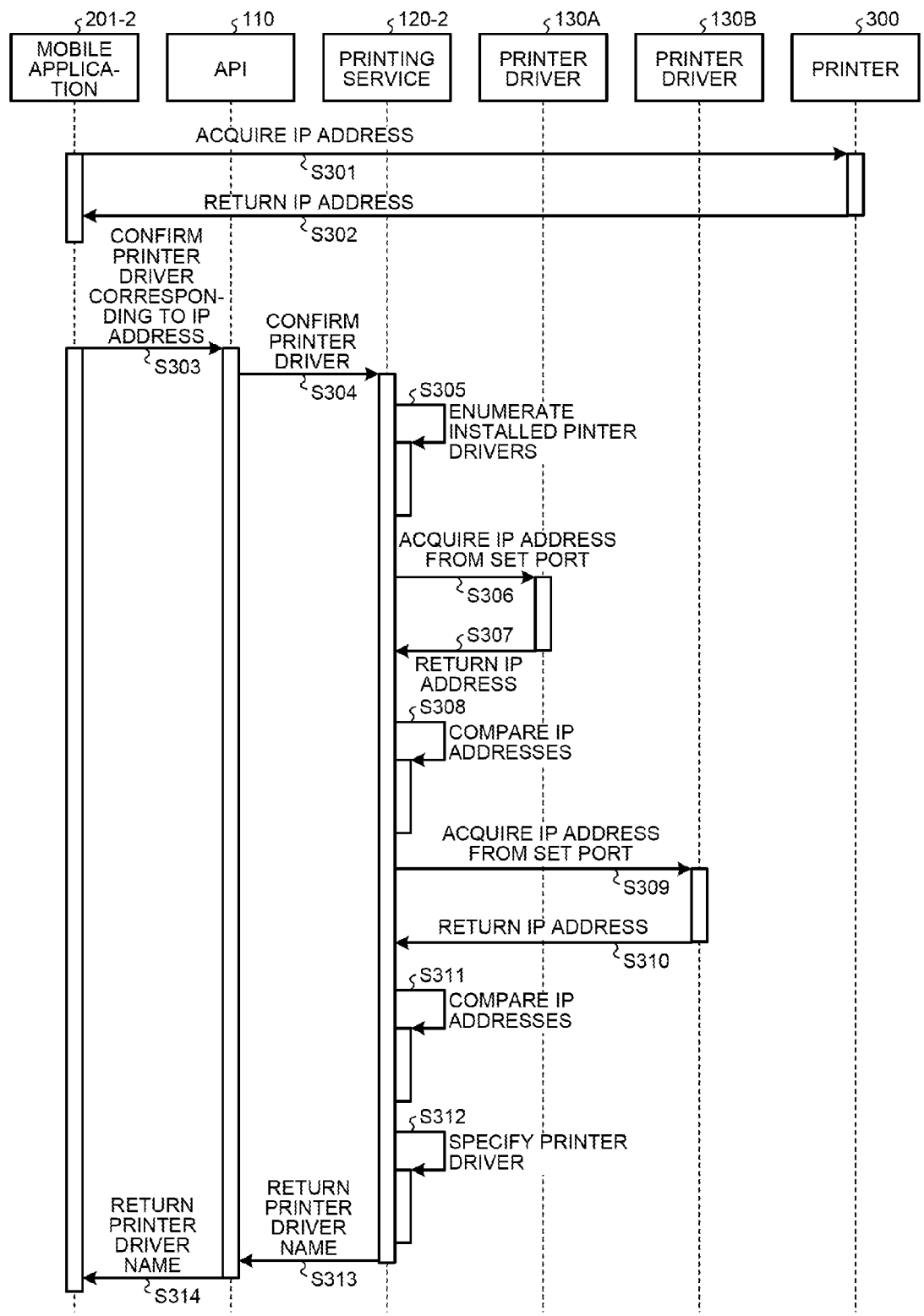
FIG. 9 is a sequence diagram of exemplary specific processing of a printer driver.

Next follows a detailed description of the processing of specifying the printer driver 130. FIG. 9 is a sequence diagram of exemplary specific processing of the printer driver 130.

First, the mobile application 201-2 acquires an IP address from the printer 300 (steps S301 and S302). The mobile application 201-2 transmits the acquired IP address to the printing service 120-2 through an API of the PC 100-2, and requests the API to confirm the printer driver 130 corresponding to this IP address (steps S303 and S304).

The acquirer 121-2 of the printing service 120-2 enumerates printer drivers 130 installed in the PC 100-2 (step S305). The acquirer 121-2 acquires IP addresses from ports set for the enumerated printer drivers 130. When the first port is the port corresponding to a printer driver 130A, the acquirer 121-2 acquires an IP address from the printer driver 130A (steps S306 and S307). The acquirer 121-2 compares the IP address acquired from the printer driver 130A and the IP address acquired from the mobile application 201-2 (step S308).

Similarly, the acquirer 121-2 acquires an IP address from a printer driver 130B (steps S309 and S310). The acquirer 121-2 compares the IP address acquired from the printer driver 130B and the IP address acquired from the mobile application 201-2 (step S311).

The acquirer 121-2 compares IP addresses in this manner, and when a match is made, specifies the printer driver 130 corresponding to the matched IP address as the printer driver 130 to be used (step S312).

The printing service 120-2 returns information (for example, the name of the printer driver 130) on the specified printer driver 130 to the mobile application 201-2 through the API 110 (steps S313 and S314).

Thereafter, the mobile application 201-2 specifies the returned information on the printer driver 130, and executes the processing described in the first embodiment such as the request to acquire a setting option.

The above-described method is not a limiting exemplary method of specifying the printer driver 130. For example, a method of specifying a printer driver from a printer model name may be used.

Third Embodiment

In the embodiments above, a file (data) stored in a mobile device is printed. A third embodiment of the present invention describes an example of printing a file stored in a PC.

Figure 10:
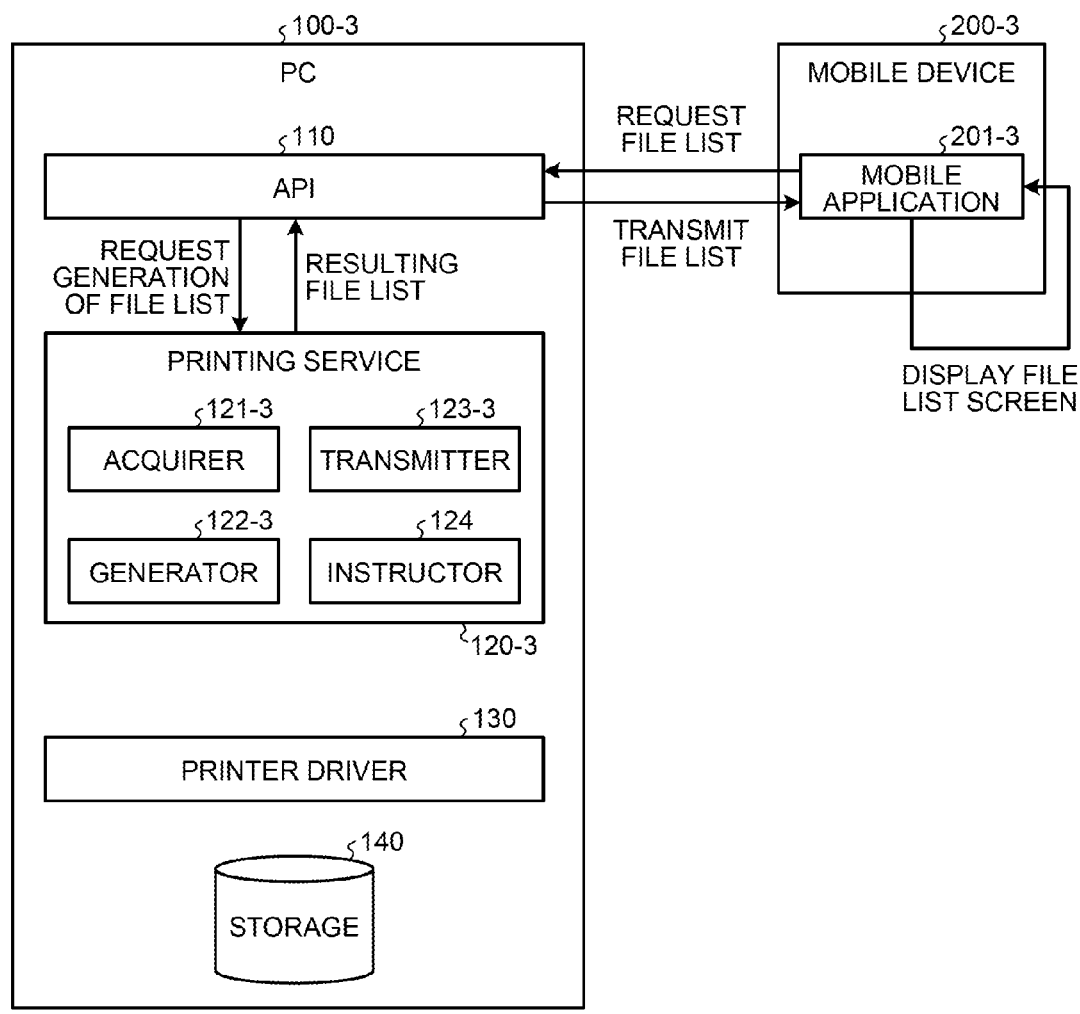
FIG. 10 is a block diagram of exemplary functional configurations of a PC and a mobile device according to a third embodiment of the present invention.

FIG. 10 is a block diagram of exemplary functional configurations of a PC 100-3 and a mobile device 200-3 according to the present embodiment. Other devices (the printer 300 and the router 400) have the same configurations as those of the first embodiment and thus are denoted by the same reference signs, and descriptions thereof will be omitted.

As illustrated in FIG. 10, the PC 100-3 includes the API 110, a printing service 120-3, the printer driver 130, and the storage 140. The mobile device 200-3 includes a mobile application 201-3.

In the third embodiment, the printing service 120-3 and the mobile application 201-3 have functions different from those in the first embodiment. Other configurations and functions are the same as those illustrated in FIG. 2, which is a block diagram according to the first embodiment, and thus denoted by the same reference signs, and descriptions thereof will be omitted.

The mobile application 201-3 differs from the mobile application 201 according to the first embodiment in that the mobile application 201-3 has an additional function of acquiring information on a file stored in the PC 100-3 and allowing specification of printing of the acquired file.

The printing service 120-3 differs from the printing service 120 according to the first embodiment in that the printing service 120-3 has an additional function of replying information on a file stored in the PC 100-3 to the mobile application 201-3 in response to a request from the mobile application 201-3, and another additional function of printing a file stored in the PC 100-3. The printing service 120-3 includes an acquirer 121-3, a generator 122-3, a transmitter 123-3, and the instructor 124.

The acquirer 121-3 has, in addition to the function of the acquirer 121 according to the first embodiment, a function of acquiring information on a file stored in, for example, the storage 140 of the PC 100-3 in response to the request from the mobile application 201-3.

The generator 122-3 has, in addition to the function of the generator 122 according to the first embodiment, a function of generating display information (second display information) for displaying a selection screen that allows selection of any one of the files the information on which has been acquired by the acquirer 121-3. This display information may be information necessary for the mobile device 200-3 (the mobile application 201-3) to generate and display the selection screen, or may be the selection screen itself. The generator 122-3 may further generate, when printing cannot be executed, error information indicating this inability to execute printing.

The transmitter 123-3 has, in addition to the function of the transmitter 123 according to the first embodiment, a function of transmitting display information for displaying a selection screen and error information to the mobile device 200-3.

The following describes specific example processing of acquiring information on a file with reference to FIG. 10. The mobile application 201-3 requests the printing service 120-3 through the API 110 to get information (file list) on a file stored in the PC 100-3.

In response to the request, the printing service 120-3 specifies a folder by using, for example, the FindFirstFile( ) function defined in Windows, and acquires files (file names) stored in the specified folder. The printing service 120-3 produces a file list including the acquired file names, and transmits the file list to the mobile application 201-3 through the API 110. The information on the files does not need to be in a table but may be in an optional format.

The mobile application 201-3 displays a selection screen that allows selection of any one of the files listed in the file list. In this example, the file list corresponds to the display information (second display information) for displaying the selection screen.

The PC 100-3 (the generator 122-3) may generate a selection screen based on the file list. In this case, the generated selection screen itself corresponds to the display information (second display information) for displaying the selection screen.

Figures 11, 12:
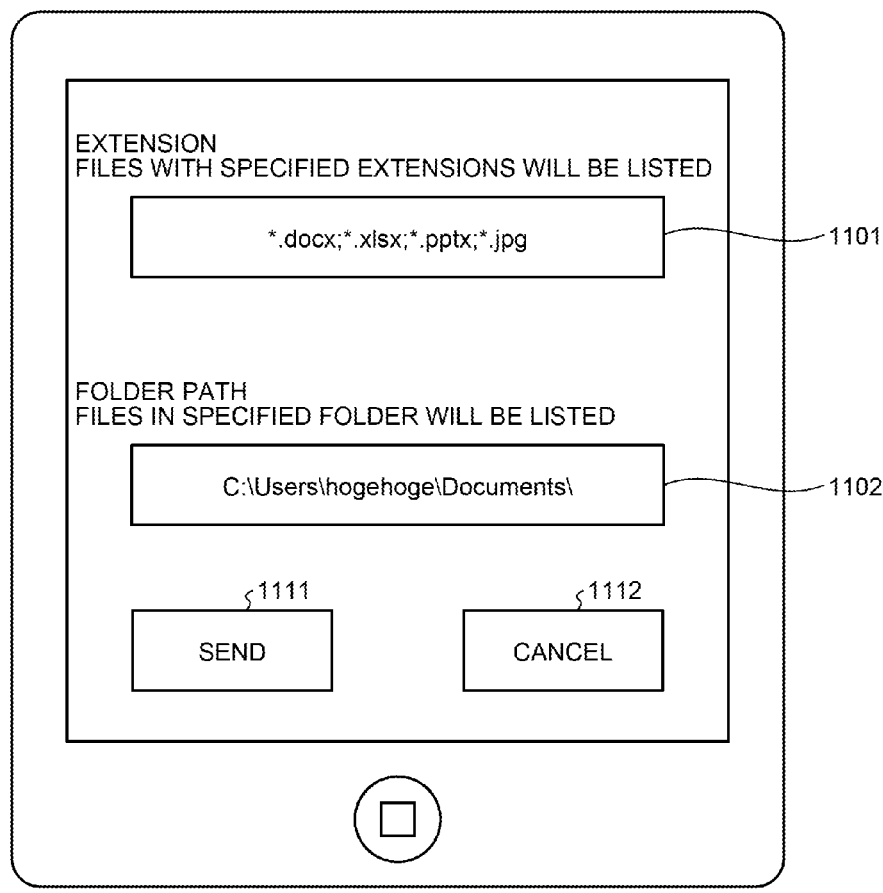
FIG. 11 illustrates an example of a specifying screen.
FIG. 12 lists exemplary information (file list) of acquired files.

The mobile application 201-3 may specify a condition on a file and acquire, from the PC 100-3, information on any file that matches the specified condition. FIG. 11 illustrates an exemplary specifying screen used in this configuration.

As illustrated in FIG. 11, the specifying screen includes input fields 1101 and 1102, a send button 1111, and a cancel button 1112. The input field 1101 is an input field for specifying the extension of a file. The input field 1102 is an input field for specifying a folder path. FIG. 11 illustrates an example in which the extension of the file and the path of a folder storing therein the file are specified as conditions. The mobile application 201-3 also transmits setting values for these conditions to the PC 100-3 at the requesting of the file list. For example, when the send button 1111 is pressed, input setting values (the extension and the folder path) for the conditions are transmitted to the PC 100-3. When the cancel button 1112 is pressed, for example, display of the specifying screen is ended.

FIG. 12 lists exemplary information (file list) on an acquired file. FIG. 12 lists exemplary information on a file obtained as a file that matches the conditions in FIG. 11. FIG. 13 illustrates an exemplary file list converted into a format for transmission to the mobile device 200-3. FIG. 13 illustrates exemplary transmission data as the file list in the XML format to which an HTTP header is attached.

FIG. 14 illustrates an exemplary selection screen that displays information on an acquired file and allows selection of a file to be printed. As illustrated in FIG. 14, the selection screen includes options 1401, a print button 1411, and a print setting button 1412. The options 1401 allow selection of one or more files among files included in an acquired file list. When any file has been selected (checked) and the print button 1411 is pressed, the mobile application 201-3 transmits an instruction to print the selected file to the PC 100-3. When the print setting button 1412 is pressed, a setting screen for print setting is displayed. Processing of producing the setting screen is executed by, for example, the same procedure as that in FIG. 4 according to the first embodiment.

Figure 15:
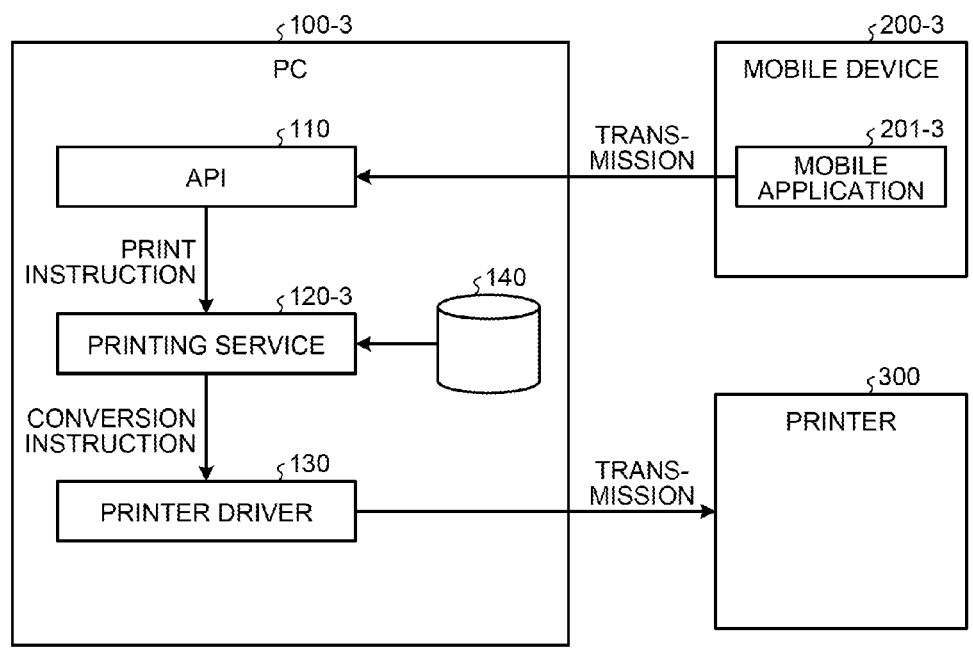
FIG. 15 is a diagram for describing a process of printing processing.

FIG. 15 is a diagram for describing a process of printing processing when the print button 1411 is pressed. The mobile application 201-3 transmits an instruction to print a file selected on a selection screen to the printing service 120-3 through the API 110. This print instruction may include information on the print setting (such as PrintTicket) set on the setting screen and the full path of the file selected.

The printing service 120-3 passes the file specified by the received full path and the print setting to the printer driver 130, thereby causing the printer driver 130 to execute printing. For example, information is set in the printer driver 130 by the same method as that in FIG. 6. When the file specified from the mobile application 201-3 does not exist in the PC 100-3 due to removal of the file, occurrence of any trouble, or other reasons, the OLE returns an error, for example. When such an error occurs, the printing service 120-3 may generate error information (the generator 122-3) and transmit this error information to the mobile application 201-3 (the transmitter 123-3). The error information includes an error message indicating the failure of printing and a file name.

Figure 16:
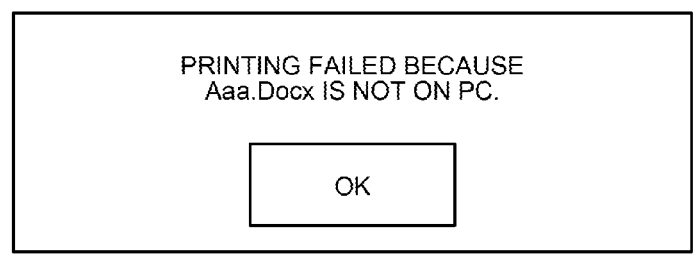
FIG. 16 illustrates an exemplary error message displayed on a mobile device.

The mobile application 201-3 may display an error message based on the error information. FIG. 16 illustrates an exemplary error message displayed by the mobile device 200-3.

Figure 17:
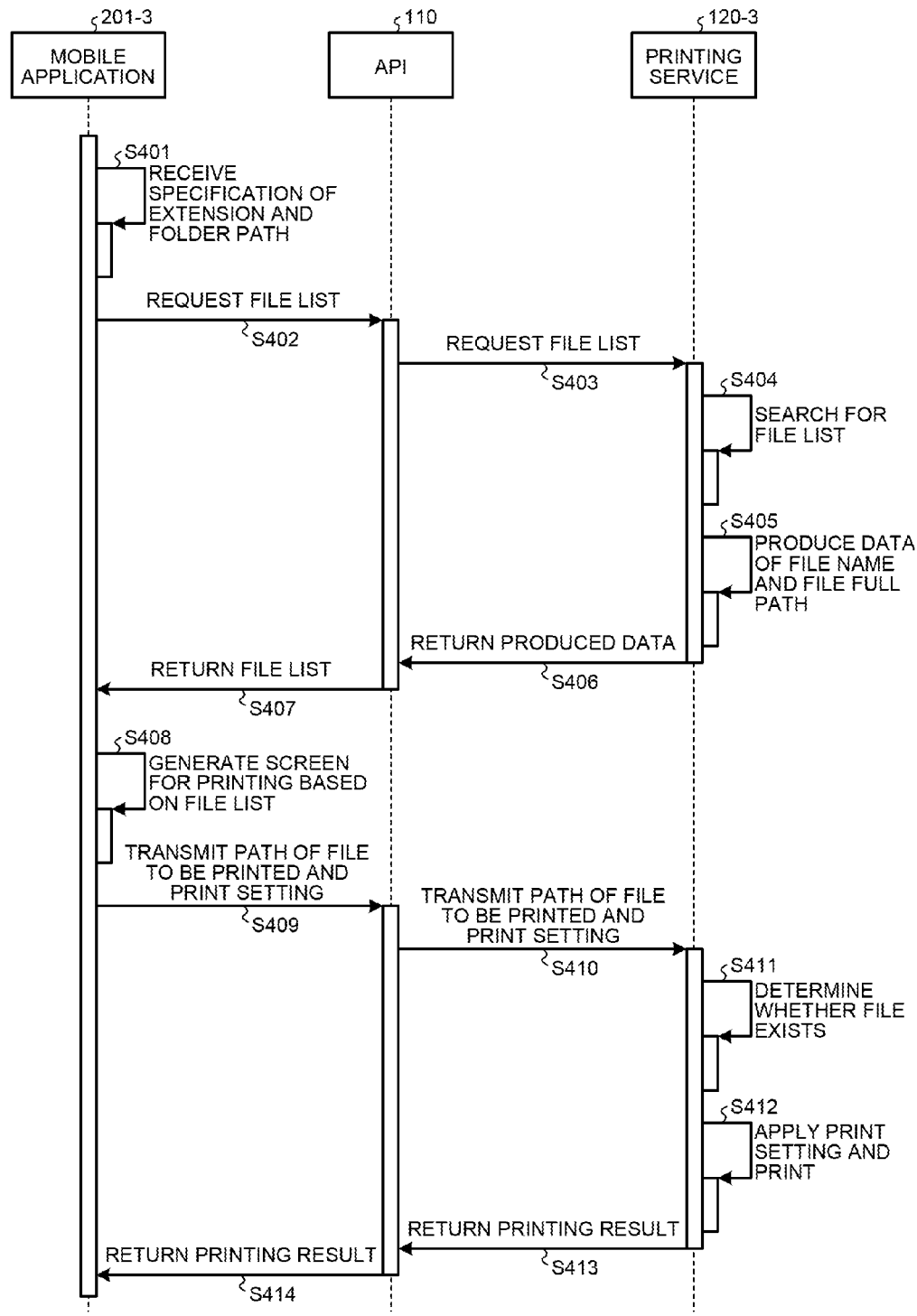
FIG. 17 is a sequence diagram of exemplary printing processing according to the third embodiment.

Further description will be made of processing of acquiring information on a file and printing a file selected based on the acquired information. FIG. 17 is a sequence diagram of exemplary printing processing according to the present embodiment.

The mobile application 201-3 receives specification of, for example, an extension and a folder path as conditions on a file to be acquired from the PC 100-3 (step S401). The mobile application 201-3 displays, for example, the specifying screen illustrated in FIG. 11, and receives a condition specified on the specifying screen. The mobile application 201-3 requests the printing service 120-3 through the API 110 to get information (file list) on a file that matches the received condition (steps S402 and S403).

The printing service 120-3 searches, for example, the storage 140 for a file that matches the specified condition (step S404). The printing service 120-3 produces information (for example, a file name) identifying each file that is searched for, and information (such as a file list) including a full path (step S405). The printing service 120-3 transmits the produced file list to the mobile application 201-3 through the API 110 (steps S406 and S407).

The mobile application 201-3 generates and displays a screen (for example, the selection screen in FIG. 14) for printing based on the file list (step S408). When a file to be printed and a print setting are specified on this screen, the mobile application 201-3 transmits the path of the file to be printed and the print setting to the printing service 120-3 through the API 110, and requests the printing service 120-3 to perform printing (steps S409 and S410).

The printing service 120-3 determines whether the file of which printing is requested exists in the PC 100-3 (step S411). If the file exists, the printing service 120-3 applies the specified print setting to this file and prints the file (step S412). The printing service 120-3 transmits a printing result to the mobile application 201-3 through the API 110 (steps S413 and S414). If it has been determined at step S411 that the file does not exist, the printing service 120-3 may transmit error information to the mobile application 201-3.

As described above, according to the third embodiment, a file stored in the PC 100-3 can be selected and printed from the mobile device 200-3.

Modification

The embodiments above each acquire a current setting value using, for example, PrintTicket and generate a setting screen to which the acquired setting value is set as a default value. The current setting value is not a limiting exemplary value to be set as the default value on the setting screen. The present modification describes a configuration in which a setting value other than the current setting value can be set as the default value on the setting screen. The following describes an example of applying the present modification to the first embodiment, but the present modification is also applicable to the second and the third embodiments.

Exemplary setting values other than the current setting value are as follows:

(A1) a set of setting values (specifying, for example, color printing, duplex printing, stapling on the upper-left corner, and punching of two holes on the left) stored in the printer driver 130 through, for example, setting by the user;

(A2) one or a plurality of setting values (specifying, for example, color printing only, and color and duplex printing) or a set of setting values stored in the mobile application 201 in advance; and (A3) one or a plurality of setting values (specifying, for example, color printing only, and color and duplex printing) or a set of setting values stored in the printing service 120.

Figure 18:
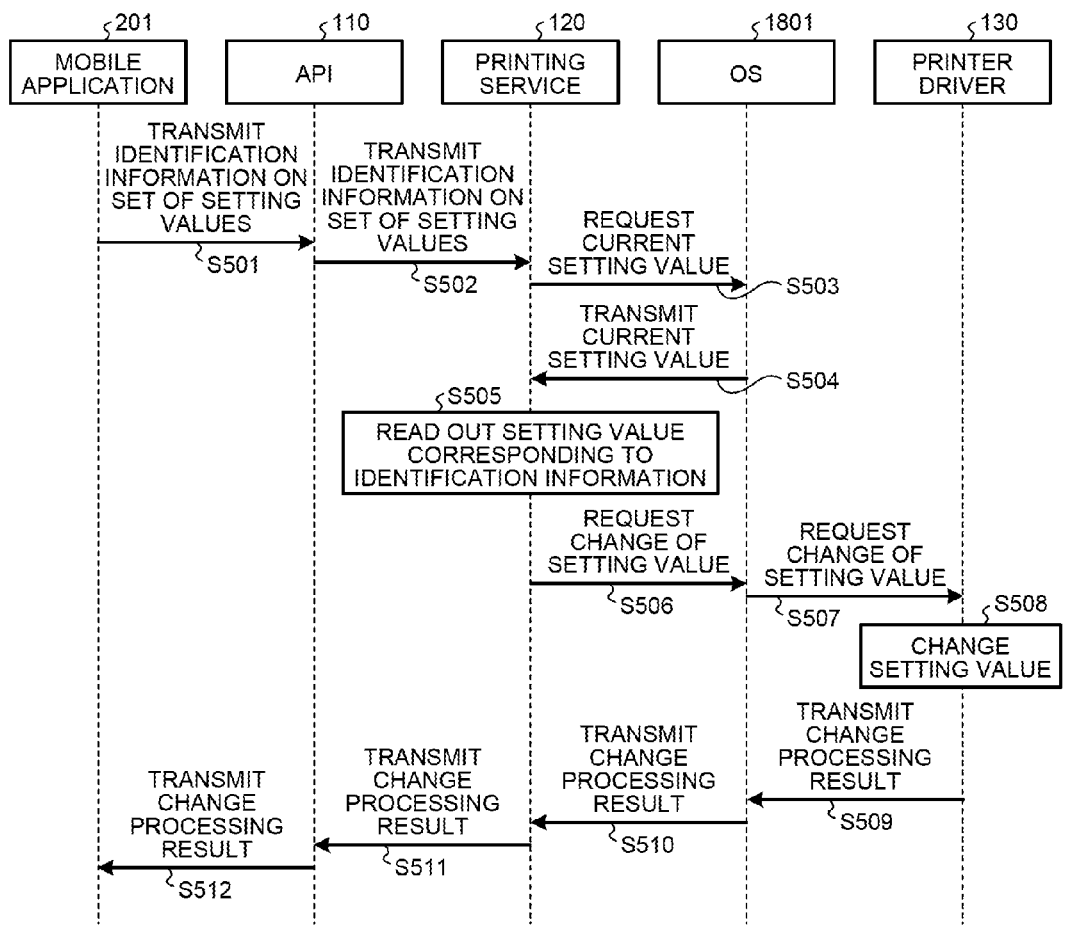
FIG. 18 is a sequence diagram of exemplary default-value change processing according to a modification.

FIG. 18 is a sequence diagram of exemplary default-value change processing according to the present modification. The default-value change processing is executed to change the default value set, for example, at step S105 in FIG. 4. The default-value change processing is executed at an optional timing, but may be executed, for example, before setting a setting screen at S207 in FIG. 7, or when a setting screen is set.

The mobile application 201 transmits, to the printing service 120 through the API 110, information (identification information) identifying a set of setting values to be set as default values on a setting screen (steps S501 and S502). For example, when a set of setting values stored in the printer driver 130 or a set of setting values stored in the printing service 120 are to be set, the mobile application 201 transmits identification information identifying the set of setting values. When a setting value or a set of setting values stored in the mobile application 201 are to be set, the mobile application 201 may transmit a setting value of each setting or of a specified setting.

The printing service 120 requests an OS 1801 to get PrintTicket (step S503). The OS 1801 transmits PrintTicket to the printing service 120 (step S504). PrintTicket indicates a current setting value of the printer driver 130.

For example, having received a request to use the currently set setting value from the user, or having received no specification, the mobile application 201 may notify the mobile application 201 of PrintTicket acquired from the OS 1801 without executing the subsequent steps S505 to S507.

If a setting value or a set of setting values stored in the printing service 120 has been specified, the printing service 120 reads out setting values stored in itself (step S505). The printing service 120 requests the printer driver 130 through the OS 1801 to change PrintTicket (steps S506 and S507).

If a setting value or a set of setting values stored in the printer driver 130 has been specified, the printing service 120 requests the printer driver 130 to change PrintTicket without executing step S505. For example, if a change is to be made into a set of setting values stored in the printer driver 130, the printing service 120 notifies the printer driver 130 of identification information identifying this set of setting values. If a change is to be made into a setting value stored in the mobile application 201, the printing service 120 notifies the printer driver 130 of the setting value itself.

The printer driver 130 changes PrintTicket based on the notified setting value or identification information (step S508). A result of this change processing by the printer driver 130 is transmitted to the mobile application 201 through the OS 1801, the printing service 120, and the API 110 (steps S509 to S512).

Thereafter, similarly to step S207 in FIG. 7, the mobile application 201 displays a setting screen including the content of PrintTicket set as the default value, and receives a change of a setting value. If the setting value has been changed, the mobile application 201 notifies the printing service 120 of the content of the change, and may execute again the change processing (steps S506 to S508) of PrintTicket.

Having set the setting value and received a print instruction from the mobile application 201, the printing service 120 requests to perform printing. This processing is executed similarly to steps S208 to S213 in FIG. 7, for example.

Display of the setting screen and printing processing in accordance with the print instruction are not necessarily executed. For example, printing may be requested from the printing service 120 right after a change of PrintTicket to a specified setting value.

Figure 19:
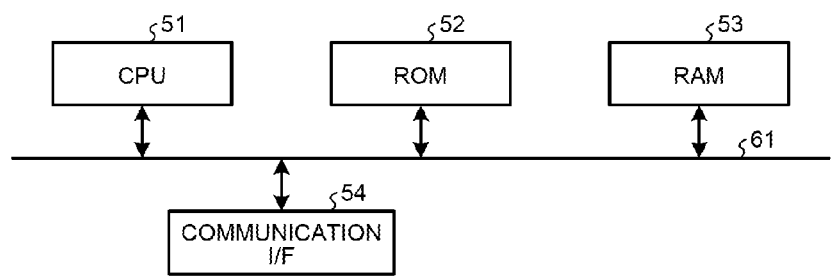
FIG. 19 is an explanatory diagram of an exemplary hardware configuration of devices according to the first to the third embodiments.

The following describes a hardware configuration of devices (a mobile device and a PC) according to the first to the third embodiments with reference to FIG. 19. FIG. 19 is an explanatory diagram of an exemplary hardware configuration of the devices according to the first to the third embodiments.

The devices according to the first to the third embodiments include a control device such as a central processing unit (CPU) 51, storage devices such as a read only memory (ROM) 52 and a random access memory (RAM) 53, a communication I/F 54 that is connected to a network and performs communication, and a bus 61 connecting these components.

A computer program executed by the devices according to the first to the third embodiments is incorporated in, for example, the ROM 52 in advance and provided.

The computer program executed by the devices according to the first to the third embodiments may be recorded in a computer-readable recording medium such as a compact disc read only memory (CD-ROM), a flexible disk (FD), a compact disc recordable (CD-R), or a digital versatile disc (DVD) as a file in an installable or executable format, and may be provided as a computer program product.

Alternatively, the computer program executed by the devices according to the first to the third embodiments may be stored in a computer connected to a network such as the Internet and may be provided through downloading via the network. Alternatively, the computer program executed by the devices according to the first to the third embodiments may be provided or distributed via a network such as the Internet.

The computer program executed by the devices according to the first to the third embodiments can cause a computer to function as each of the devices described above. The CPU 51 of this computer can load the computer program from a computer-readable recording medium onto a main storage device and execute the computer program.

The present invention enables more effective use of functions of a printer driver in printing from a terminal device such as a mobile device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system comprising:
an information processing apparatus including,
  a memory storing computer-executable instructions, and
  one or more processors configured to execute the computer-executable instructions such that the one or more processors are configured to,
    receive a request from a terminal device,
    acquire, from a printer driver of the information processing apparatus, at least one setting option settable in the printer driver,
    generate, in response to the request, first information that identifies the acquired at least one setting option, and
    transmit the first information to the terminal device.

2. The information processing system according to claim 1, wherein the one or more processors are configured to execute the computer-executable instructions such that the one or more processors are further configured to,
  acquire a setting value settable in the acquired at least one setting option, and
  generate the first information.

3. The information processing system according to claim 1, wherein the one or more processors are configured to execute the computer-executable instructions such that the one or more processors are further configured to acquire the at least one setting option from a specified printer driver among one or more printer drivers.

4. The information processing system according to claim 3, wherein the one or more processors are configured to execute the computer-executable instructions such that the printer driver is a printer driver for a printer identified by specified identification information among one or more printer drivers.

5. The information processing system according to claim 1, wherein the one or more processors are configured to execute the computer-executable instructions such that the one or more processors are further configured to, generate second information that identifies one of one or more pieces of data stored in a storage, and transmit the second information to the terminal device.

6. The information processing system according to claim 5, wherein the one or more processors are configured to execute the computer-executable instructions such that the one or more processors are further configured to generate the second information such that piece of data identified by the second information is a piece data that matches a specified condition among the data stored in the storage.

7. The information processing system according to claim 1, wherein the one or more processors are configured to execute the computer-executable instructions such that the one or more processors are further configured to, generate, when printing is not executable, error information that indicates inability to execute printing, and transmit the error information to the terminal device.

8. The information processing system according to claim 1, wherein the one or more processors are configured to execute the computer-executable instructions such that the one or more processors are further configured to instruct, to the printer driver, printing according to a setting option set on the terminal device.

9. An information processing apparatus comprising:
a memory storing computer-executable instructions, and
one or more processors configured to execute the computer-executable instructions such that the one or more processors are configured to,
receive, from a terminal device, a request for at least one setting option settable in a printer driver of the information processing apparatus,
acquire, from a printer driver, at least one setting option settable in the printer driver, in response to the request;
generate first display information for displaying, on the terminal device, a setting screen configured to allow a user to set the acquired at least one setting option; and
transmit the first display information to the terminal device.

10. A non-transitory computer-readable storage medium including computer-executable instructions that, when executed by one or more processors of an information processing apparatus, cause the one or more processors to perform operations including:
receiving, from a terminal device, a request for at least one setting option settable in a printer driver of the information processing apparatus;
acquiring, from a printer driver, at least one setting option settable in the printer driver, in response to the request;
generating, in response to the request, first information that identifies the acquired at least one setting option; and
transmitting the first information to the terminal device.

* * * * *